May 9, 1967 G. ARSHAL 3,319,052

DIRECTIONAL COMPUTER

Original Filed July 2, 1962 7 Sheets-Sheet 1

INVENTOR.

George Arshal

INVENTOR.
George Arshal

INVENTOR.
George Arshal

INVENTOR.
George Arshal

May 9, 1967 G. ARSHAL 3,319,052

DIRECTIONAL COMPUTER

Original Filed July 2, 1962

7 Sheets-Sheet 5

INVENTOR.

George Arshal

INVENTOR.
George Arshal

May 9, 1967 G. ARSHAL 3,319,052
DIRECTIONAL COMPUTER
Original Filed July 2, 1962 7 Sheets-Sheet 7

INVENTOR.
George Arshal

United States Patent Office 3,319,052
Patented May 9, 1967

3,319,052

DIRECTIONAL COMPUTER

George Arshal, 714 Ardmore Ave., Redlands, Calif. 92373

Continuation of application Ser. No. 206,801, July 2, 1962. This application Jan. 20, 1966, Ser. No. 533,106
25 Claims. (Cl. 235—150.26)

This application is a continuation of pending patent application No. 206,801 of filing date July 2, 1962, now abandoned.

The invention is a vectorial data processing system for extracting or prescribing directions and their rates of change from given input vectors. It offers efficiency and versatility for producing the direction in satisfaction of any and all geometrical and rate of change properties that are possibly possessed by a direction. While offering this facility, the directional computer can be realized in conjunction with any physically demonstrated frame of reference.

The directional computer proceeds on the principle that a direction changes when it is given an angular velocity. Any input vector can enter the directional computer and assert the angular velocity of the output direction in one or both of two ways:

(1) So that the output direction rotates around the input vector to describe a conical surface.
(2) So that the output direction rotates directly towards the input vector and seeks coalignment.

The rate of action in each case depends on the magnitude of the input vector. The rates are independently controllable by modifying the input vector through distinct scalar coefficients. This holds implications beyond a complete capability of controlling the directional rates of change. The scalar coefficient controlling either mode of directional rate of change can clearly be made zero to stop this process, or it can be made negative to reverse the process. Where it is desired to rotate the output direction around the input vector (mode 1 above) to a particular azimuth, it is only necessary to make the scalar coefficient controlling this rate of turn responsive to the deviation of the output direction from the desired azimuth. In like manner, the scalar coefficient controlling the output direction's rate of turn towards the input vector (mode 2 above) can guide this process into a desired relative angle. The scalar coefficient simply has to register the deviation of the output direction from its desired angle relative to the input vector.

These capabilities of the directional computer support applications exceeding the stabilization functions of one kind or another associated with previous directional output devices. They additionally service demanding applications requiring wide ranging directional controls under a variety of options.

Aircraft flight control offers a case in point. Very effective flight control can be achieved by automatically controlling the aircraft's velocity to a given direction. Thereafter, the direction is solely responsible for guiding the aircraft. The direction must be produced with the versatility of generating any flight path desired.

Figure 1:
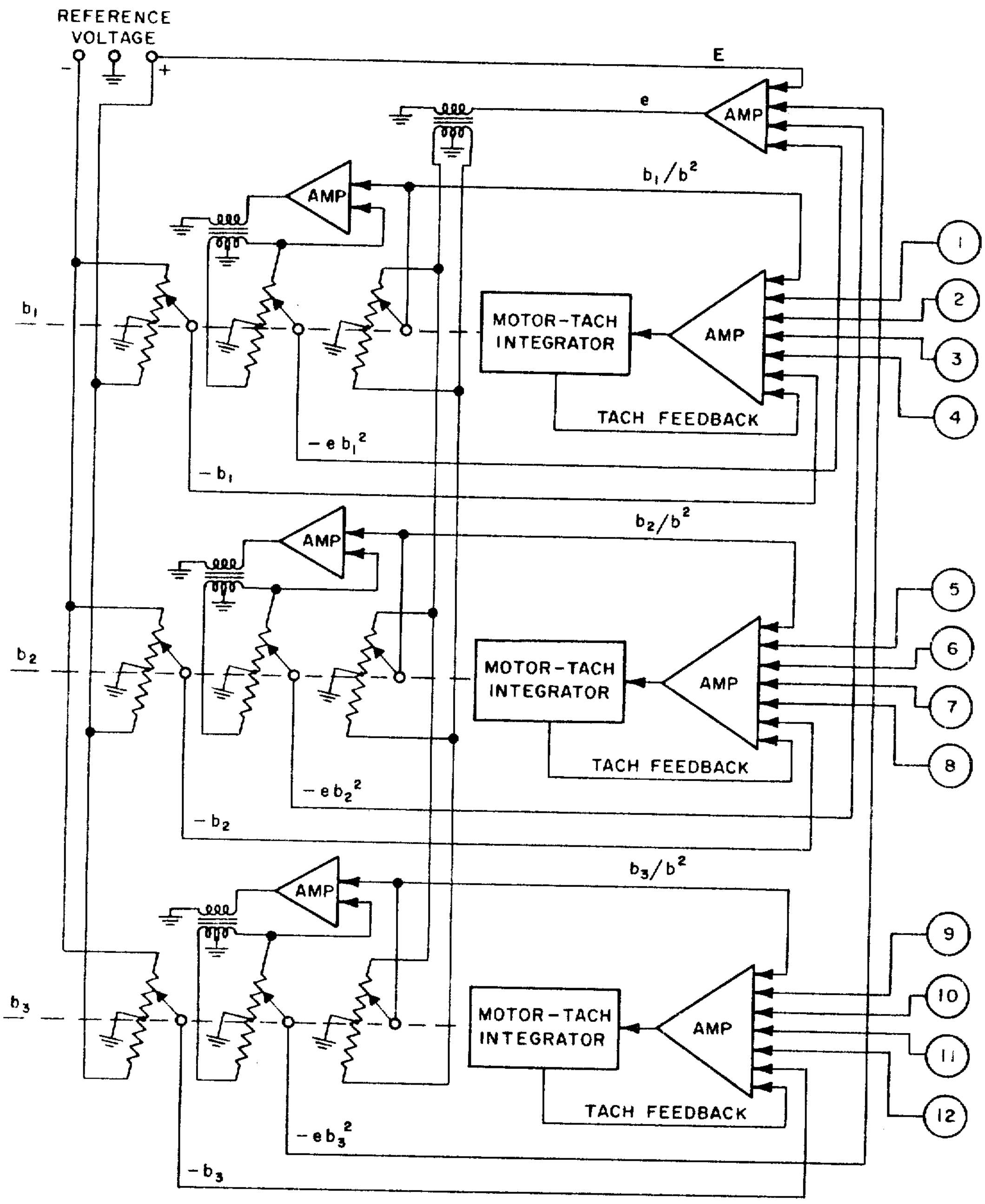
Figure 1A:
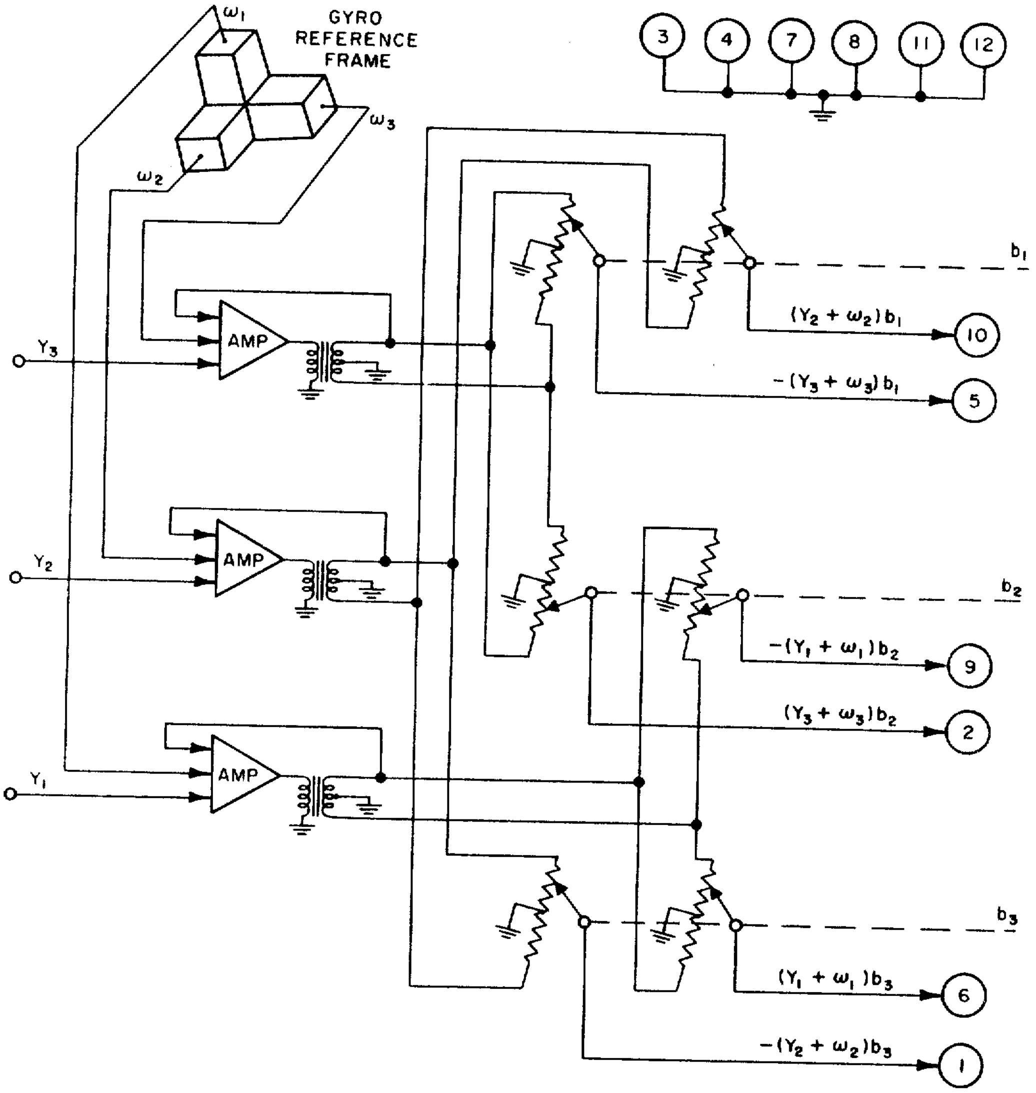
Figure 1B:
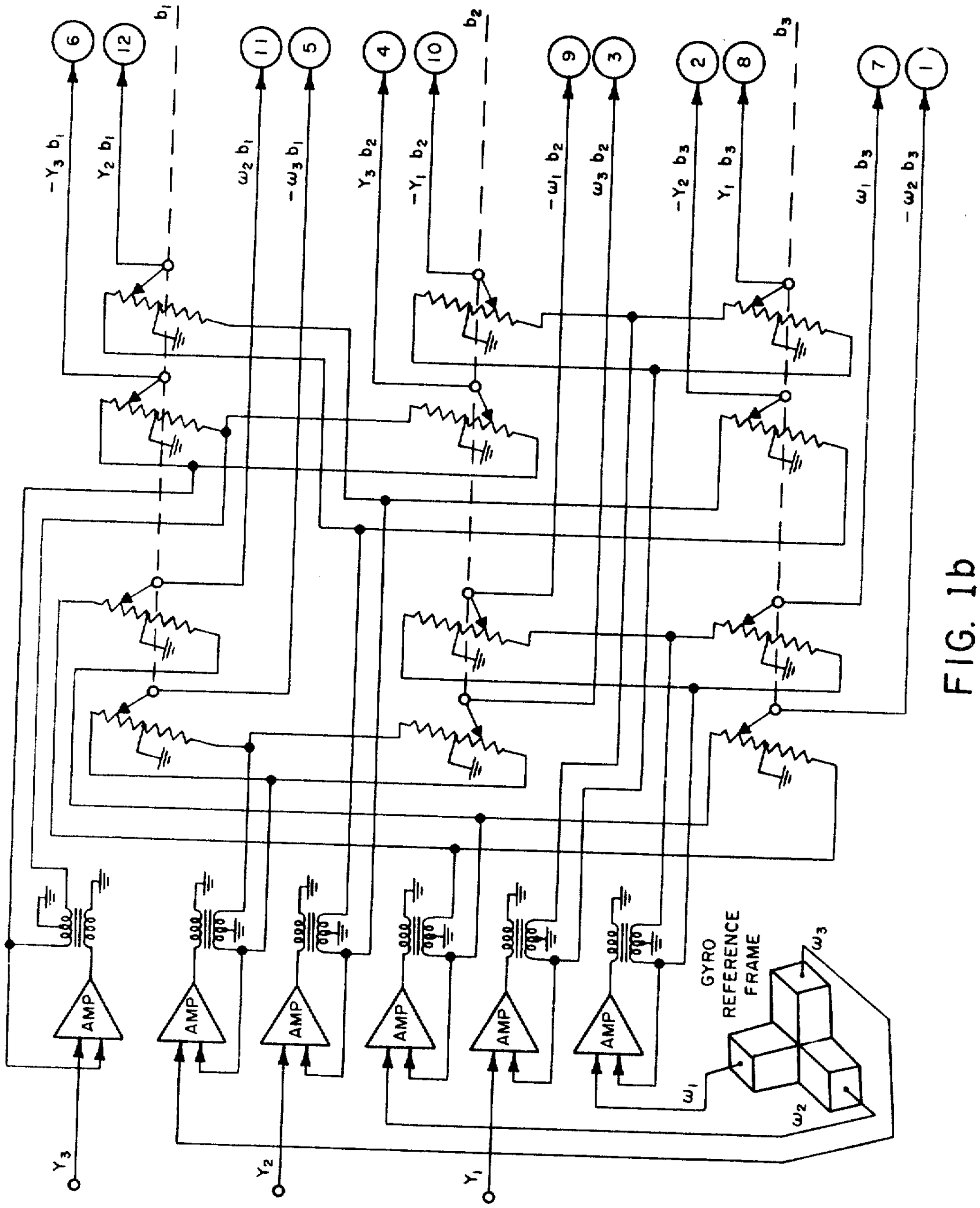
Figure 1C:
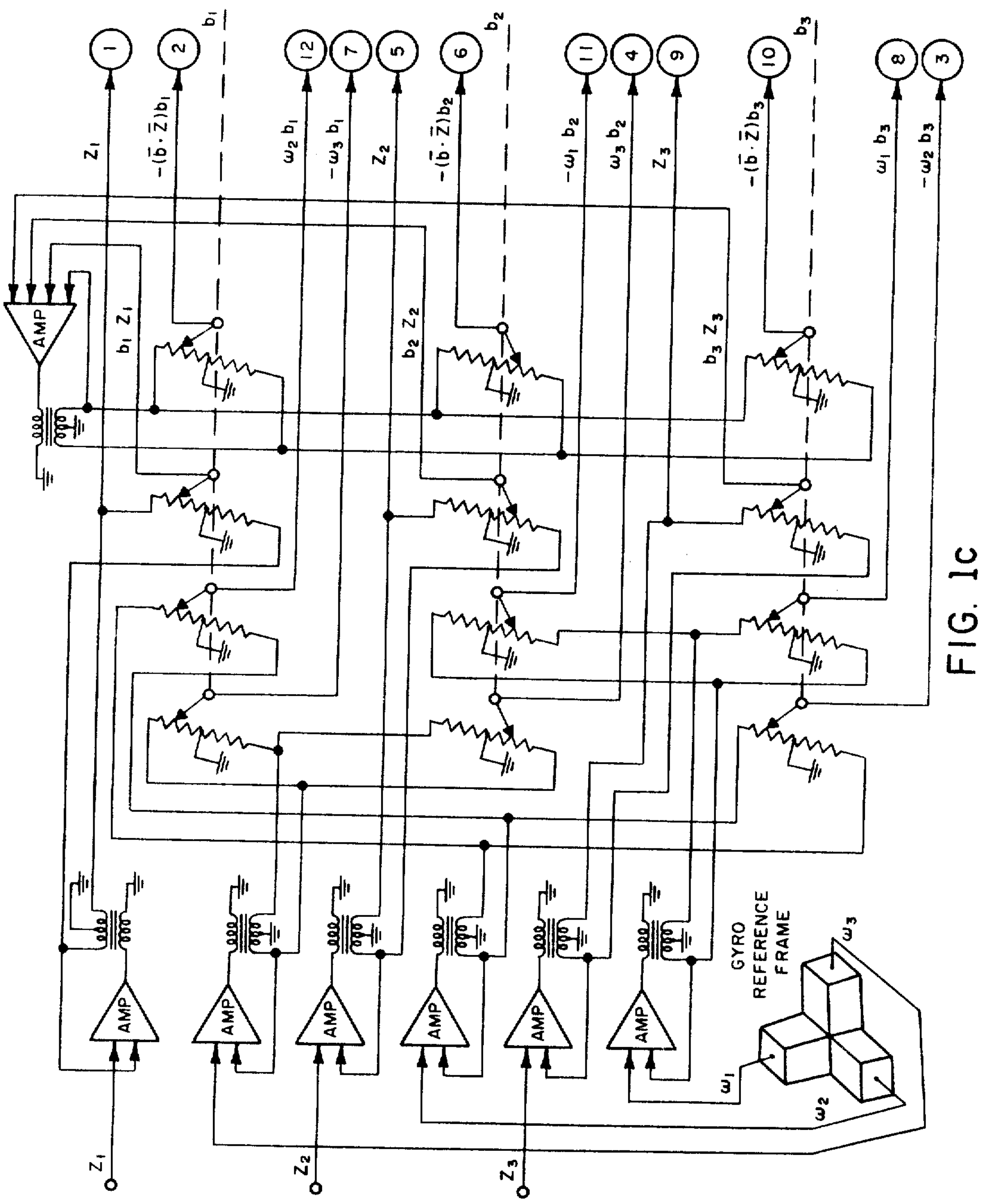
Figure 1D:
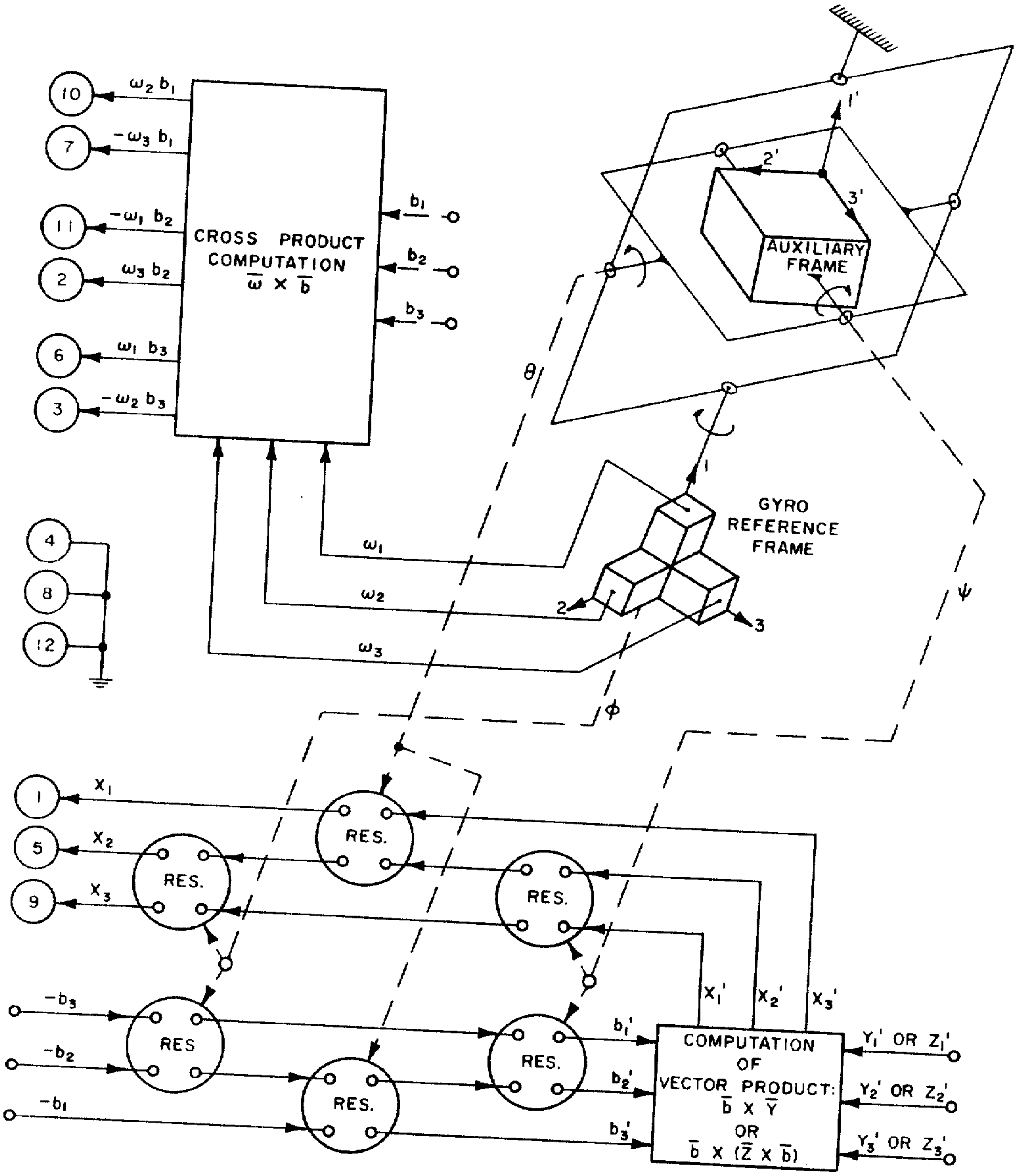
Figure 2:
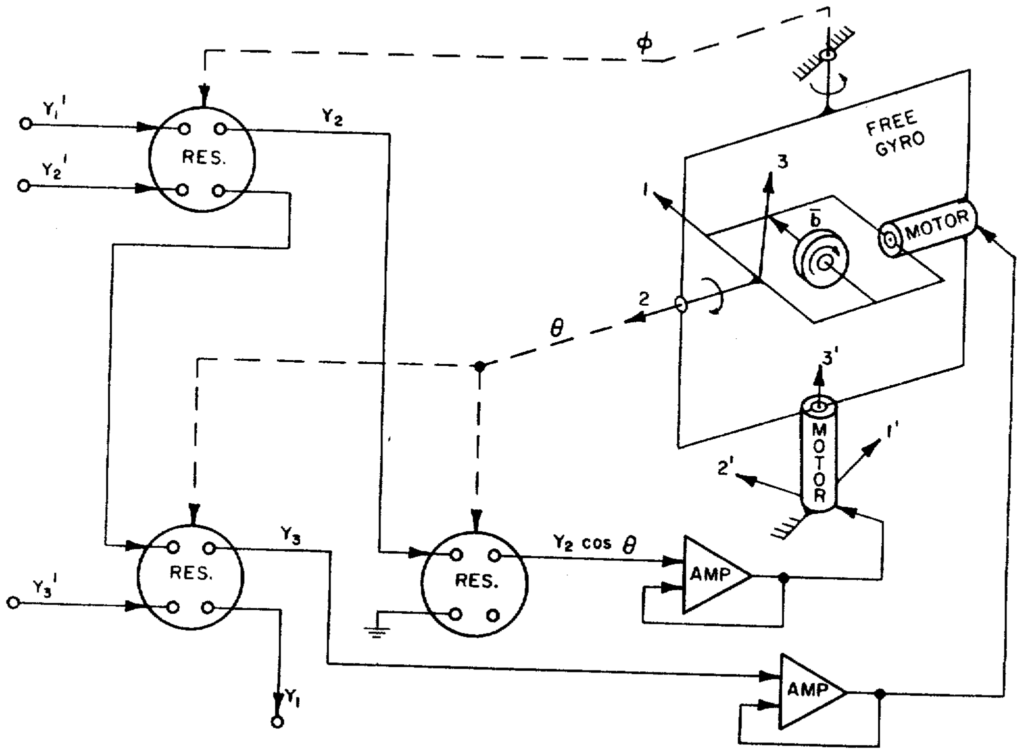
Figure 3:
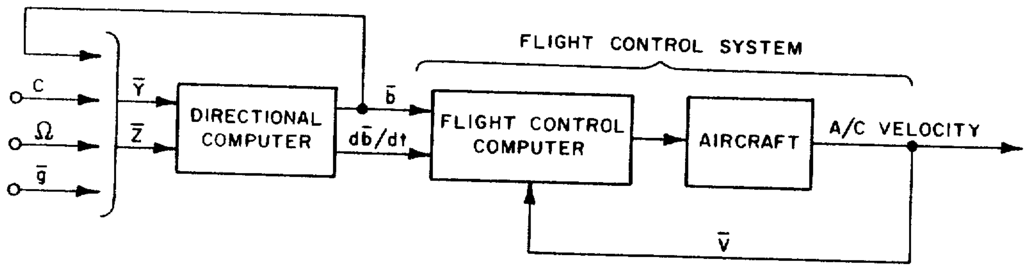
Figure 4:
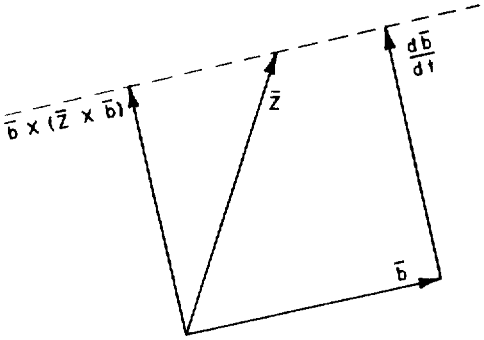
Figure 5:
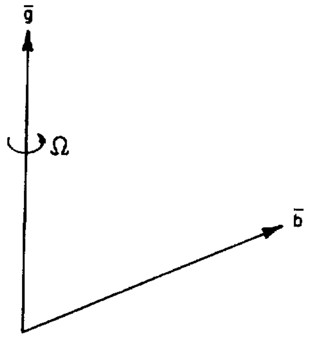
Figure 6:
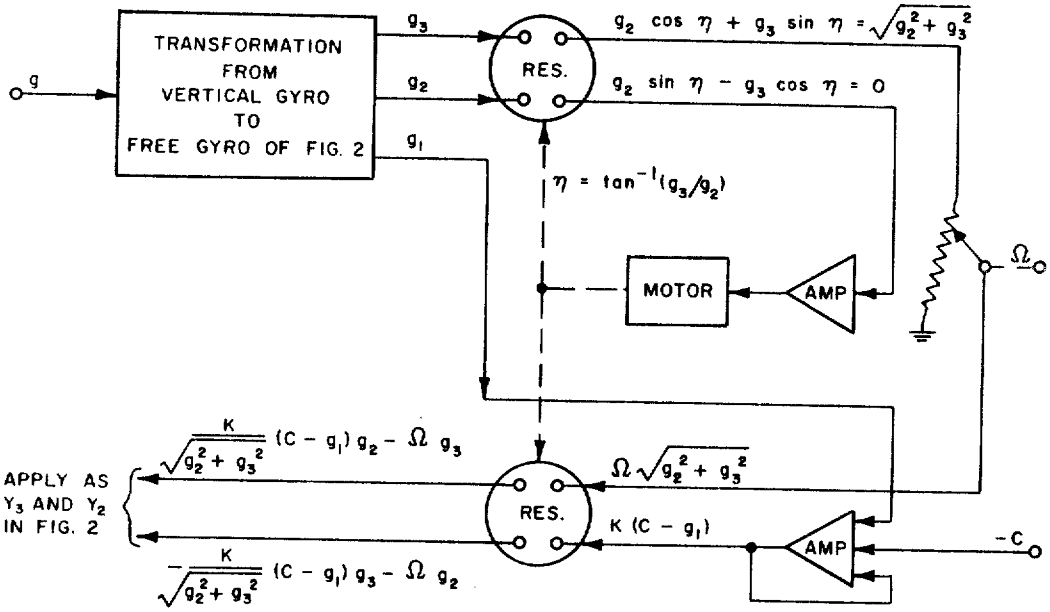

FIGURE 1 and any one of FIGURES 1*a*, 1*b*, 1*c* and 1*d* together draw an embodiment of the directional computer. FIGURE 2 is another embodiment. FIGURE 3 illustrates an application of the directional computer. FIGURES 4 and 5 are geometrical representations of basic processes supported by the computer. FIGURE 6 illustrates a specifically identified input vector under the embodiment of FIGURE 2.

The directional computer, in all its embodiments, is an implementation of the relationship:

$$\bar{b}=\int\left[\left(\frac{A}{b^2}-B\right)\bar{b}+\bar{b}\times\bar{Y}\right]dt \qquad (1)$$

where $\bar{b}$ represents the directional output vector; $\bar{Y}$ represents any given vector or the result of a combination of vectors; A and B represent scalar constants. Under this formulation, $\bar{b}$ is maintained at a constant length, having therefore a purely directional significance, and its direction is controlled with complete versatility by the choice of $\bar{Y}$.

These events are understood from the derivative form of (1):

$$\frac{d\bar{b}}{dt}=\left(\frac{A}{b^2}-B\right)\bar{b}+\bar{b}\times\bar{Y} \qquad (2)$$

If (2) is multiplied out scalarly by $\bar{b}\cdot$, the relationship establishing its magnitude is isolated as $$\bar{b}\cdot\frac{d\bar{b}}{dt}=\frac{1}{2}\frac{d}{dt}(b^2)=A-Bb^2 \qquad (3)$$

This is a linear, first order differential equation in $b^2$. Under this relationship, $b^2$ soon assumes the value $A/B$ and then holds it indefinitely. Thereafter, relation (2) is represented in its essential characteristics by:

$$\frac{d\bar{b}}{dt}=\bar{b}\times\bar{Y} \qquad (4)$$

since this relation does not disturb the magnitude of $\bar{b}$. If (4) is multiplied vectorially by $$\frac{\bar{b}}{b^2}\times$$

its action is described in full by:

$$\frac{\bar{b}}{b^2}\times\frac{d\bar{b}}{dt}=-\frac{\bar{b}}{b}\times\left(\bar{Y}\times\frac{\bar{b}}{b}\right) \qquad (5)$$

The left side of (5) is identically equal to the angular velocity of $\bar{b}$ and the right side of (5) produces it as the portion of $-\bar{Y}$ that is perpendicular to $\bar{b}$.

Since the input vector $\bar{Y}$ is open to choice, it can be stated as:

$$\bar{Y}=\bar{Z}\times\bar{b} \qquad (6)$$

where $\bar{Z}$ is a given vector. Then relation (1) becomes:

$$\bar{b}=\int\left[\left(\frac{A}{b^2}-B\right)\bar{b}+\bar{b}\times(\bar{Z}\times\bar{b})\right]dt \qquad (7)$$

and has the alternative form:

$$\bar{b}=\int\left[\left(\frac{A}{b^2}-B\right)\bar{b}+b^2\bar{Z}-(\bar{b}\cdot\bar{z})\bar{b}\right]dt \qquad (8)$$

This follows from the "continued vector product" formula. The coefficient $b^2$ multiplying $\bar{Z}$ in (8) can be replaced by the value $A/B$ given to it by relation (3). That is, the input (6) can be asserted in relation (1) as:

$$\frac{A}{B}\bar{Z}-(\bar{b}\cdot\bar{Z})\bar{b}=\bar{b}\times\bar{Y} \qquad (9)$$

The result of this substitution and relation (7) are functionally the same.

Relation (7) possesses a basic computational capability. Under the input and feedback carried in $\bar{b}\times\bar{Z}\times\bar{b}$, the direction $\bar{b}$ is driven into coincidence with the direction of $\bar{Z}$. The magnitude of $\bar{Z}$ is immaterial to the process so long as it is scaled up by a substantial gain factor. The fact that the input $\bar{Z}$ can be scaled arbitrarily in the process of extracting its direction is a variable computational convenience. Also, the rate of change $$\frac{d\bar{b}}{dt} \propto \frac{d}{dt}(\bar{Z}/Z)$$

is immediately available as $\bar{b}\times(\bar{Z}\times\bar{b})$ itself.

Possible vector inputs as $\bar{Y}$ or $\bar{Z}$ are represented in such measurements as velocity, acceleration, range, bearing, navigational heading and vertical reference outputs, and the like. The data are intelligible only in reference to particular defined directions where the directions are defined by being exhibited. As such, the measurements express vectors. They can be utilized to express $\bar{Y}$ or $\bar{Z}$ as desired. In general, a vector consists in one or more scalar values assigned to one or more physically defined directions. This is all that's necessary to express $\bar{Y}$ or $\bar{Z}$.

Specific examples of $\bar{Y}$ or $\bar{Z}$ are readily selected to suit specific applications of the directional computer. The problem of aircraft flight control offers a useful demonstration of this.

An aircraft maneuvers about by the act of turning its velocity and accepts guidance through its ability to control the direction of its velocity. As a first requirement of developing such guidance, the direction of flight must be prescribed and given to the aircraft's flight control system. The output $\bar{b}$ of the directional computer provides that service. In addition, the rate of change of $\bar{b}$ must be supplied to the flight control system. The aircraft can sustain its velocity along a given, changing direction only if it develops the necessary accelerations. $d\bar{b}/dt$ is essential for an assertion of these acceleration requirements. It is immediately available as the integrand $\bar{b}\times\bar{Y}$ controlling the direction of $\bar{b}$. Finally, the direction $\bar{b}$ must be responsive to navigational data, which may be entered manually as pilot commanded signals, or automatically by various navigational instruments, or by a combination of manual and automatic means. The inputs $\bar{Y}$ and $\bar{Z}$ given to the directional computer can accommodate any such requirements.

FIGURE 3 is a block diagram of this flight control scheme. The "flight control computer" operates the aircraft's control surfaces to maintain coalignment between the direction $\bar{b}$ and the aircraft velocity $\bar{V}$. Subsequently, the direction $\bar{b}$ "flies" the aircraft. Such automatic controls are an essential part of any automatic aircraft guidance system and serve further, under manual guidance, to overcome deficiencies that might otherwise be present in the handling characteristics of the aircraft. The inputs $\bar{Y}$ and $\bar{Z}$ shown entering the directional computer are examples composed by the quantities $\bar{b}$, C, $\Omega$, and $\bar{g}$. The vector $\bar{g}$ represents the local vertical direction that is furnished aboard the aircraft by a vertical gyro; the scalars C and $\Omega$ represent quantities that are expressly produced to prescribe a desired climb angle and a desired horizontal rate of turn in $\bar{b}$. Under this development, C and $\Omega$ in FIGURE 3 can be generated manually in lieu of manually applied elevator and aileron deflections.

The input $\bar{Z}$ in relation (7) can be qualified so that the quantity C effects any desired climb angle in the output $\bar{b}$. In function, relation (7) is the same as $$\frac{d\bar{b}}{dt}=\bar{b}\times(\bar{Z}\times\bar{b}) \qquad (10)$$

and it drives $\bar{b}$ into the direction of $\bar{Z}$. This action is immediately evident from the geometrical representation of FIGURE 4. For interpretive convenience, $\bar{b}$ may be regarded here as having unit length. Then the quantity $\bar{b}\times(\bar{Z}\times\bar{b})$ is just the vector component of $\bar{Z}$ that is perpendicular to $\bar{b}$. $\bar{b}$ proceeds under such rate of change into the direction of $\bar{Z}$ and then persists along $\bar{Z}$. The convergence is fast or slow depending on the magnitude of $\bar{Z}$.

If $\bar{Z}$ is expressed as:

$$\bar{Z}=\alpha\bar{g} \qquad (11)$$

where $\alpha$ is a scalar coefficient and $\alpha>0$, $\bar{b}$ is driven into the direction of $\bar{g}$; that is: the scalar product $\bar{g}\cdot\bar{b}$ is maximized. However, if $\alpha$ should become zero this process is stopped, and it is reversed if $\alpha$ should be negative. This offers a means of controlling $\bar{g}\cdot\bar{b}$. $\alpha$ can be defined as $$\alpha=K_1(C-\bar{g}\cdot\bar{b}) \qquad (12)$$

wherein $K_1$ represents gain. Then, $$\bar{Z}=K_1(C-\bar{g}\cdot\bar{b})\bar{g} \qquad (13)$$

With this input, relation (10) drives $\bar{g}\cdot\bar{b}$ to the value C. However, as an applied input, (13) is not necessarily formed altogether external to the directional computer. Only $\bar{g}$ and C need be introduced externally. Thereafter, the scalar multiplying coefficient $\alpha=K_1(C-\bar{g}\cdot\bar{b})$ and others that modify vectors can be interposed internally.

A horizontal rate of turn in $\bar{b}$ is asserted by an angular velocity about the vertical direction $\bar{g}$. This is evidentf from FIGURE 5. Such rotations of $\bar{b}$ are produced directly by the input vector $\bar{Y}$, but in opposite sense as noted by relation (5). It is only necessary to assert $\bar{Y}$ as $$\bar{Y}=-\Omega\bar{g} \qquad (14)$$

in order to give the horizontal projection of $\bar{b}$ any desired rate of rotation $\Omega$ about $\bar{g}$.

The inputs $\bar{Z}$ and $\bar{Y}$ as the statements (13) and (14) are mutually compatible and can enter the directional computer simultaneously in superposition. They are so applied in FIGURE 3. Alternatively, since $\bar{Z}\times\bar{b}$ is equivalent to an input $\bar{Y}$, (13) and (14) combine as the composite statement:

$$\bar{Y}=K_1(C-\bar{g}\cdot\bar{b})\bar{g}\times\bar{b}-\Omega\bar{g} \qquad (15)$$

The quantities C and $\Omega$ are readily generated from instrumentational measurements as range, altitude, elevation, bearing, heading, etc. in order to suit specific automatic guidance requirements. In this connection, $\Omega$ can be further specialized in (14) or (15) as $$\Omega=K_2\bar{b}\cdot\bar{g}\times\bar{d} \qquad (16)$$

where $K_2$ is a gain factor and the vector $\bar{d}$ is supplied by bearing and heading data. (16) becomes zero when $\bar{b}$, $\bar{g}$, and $\bar{d}$ are coplanar, and it acts to produce this condition. Consequently, $\bar{b}$ will be constrained to lie in the vertical plane defined by $\bar{g}$ and $\bar{d}$.

Altogether, the directional computer, by the choice of input vector (as $\bar{Y}$ or $\bar{Z}$ or both) and the options of modifying it by a few appropriate scalar coefficients, is able to exert a wide range of directional controls responsive to many data sources in a number of ways. In different problem settings, the same practices apply with different vector quantities. Of course, $\bar{Y}$ or $\bar{Z}$ can also be formed as elaborately as necessary to begin with.

The directional computer can be realized in conjunction with a reference frame formed by a physically defined set of three mutually orthogonal directions, providing the component angular velocities (relative to space) of this reference frame are known by measurement or otherwise. Relation (1) is stated for such a reference frame F as $$\bar{b}=\int_F\left[\left(\frac{A}{b^2}-B\right)\bar{b}+\bar{b}\times\bar{Y}+\bar{b}\times\bar{\omega}\right]dt \qquad (17)$$

where the subscript F on the integral sign identifies F as the reference frame for the integration (the reference frame relative to which the integration proceeds) and $\bar{\omega}$ represents the angular velocity of F. The process of integrating relative to a reference frame F means only that the components of the integrand as observed in F are the quantities to be integrated. The resulting integral outputs have the same reference axes as their respective integrands and express the integral output vector. When the reference frame F is held fixed in space by maintaining its angular velocity $\bar{\omega}$ at zero, relation (17) obtains its functionally equivalent form of relation (1). The integral sign, without subscript, in relation (1) is understood to represent integration relative to space.

If the vector $\bar{Y}$ is of the form $\bar{Y}=\bar{Z}\times\bar{b}$, relation (9) may be applied so that (17) becomes:

$$\bar{b}=\int_F\left[\left(\frac{A}{b^2}-B\right)\bar{b}+\frac{A}{B}\bar{Z}-(\bar{b}\cdot\bar{Z})\bar{b}+\bar{b}\times\bar{\omega}\right]dt \qquad (18)$$

The reference frame may be defined in conjunction with means of ascertaining its angular velocity. As an example, a vertical gyro and a gyro compass, as conventionally used in aircraft, together define a reference frame having substantially zero components of angular velocity. The two gyro spin axes define a plane which locates mutual perpendiculars from the spin axis of the vertical gyro both in and out of the plane. The vertical spin axis and its two mutual perpendiculars constitute a stable, physically defined frame of reference. Another reference frame which offers a self-contained capability of expressing its component angular velocities is represented in three rate gyros, the three gyros being rigidly intermounted so that their sensitive axes are mutually orthogonal. The three gyros, as a unit, can be mounted or oriented arbitrarily in any manner desired.

The arbitrarily oriented gyro reference frame is analytically the most general case for instrumentational development. It carries the possibility of being constrained to zero values of component angular velocity, either in whole or in part, and also carries the possibility of being controlled into special values of angular velocity.

The gyro reference directions can be identified as 1, 2, and 3. The directional output $\bar{b}$ is produced as three components $b_1$, $b_2$, and $b_3$ referred to these directions. The angular velocity outputs $\omega_1$, $\omega_2$, and $\omega_3$ from the three gyros naturally refer to these directions. The vector product $\bar{b}\times\bar{Y}$ or $\bar{b}\times(\bar{Z}\times\bar{b})$ must also be expressed in the directions 1, 2, 3. If $\bar{Y}$ or $\bar{Z}$ is initially received in an auxiliary frame of reference, a coordinate transformation can be applied to reproduce it by its components $Y_1$, $Y_2$, $Y_3$ or $Z_1$, $Z_2$, $Z_3$ in the directions 1, 2, 3. Thereupon, $\bar{b}\times\bar{Y}$ or $\bar{b}\times(\bar{Z}\times\bar{b})$ can be formed in immediate reference to these directions. Alternatively the output $\bar{b}$ can be transformed into the auxiliary reference frame of $\bar{Y}$ or $\bar{Z}$, there to form $\bar{b}\times\bar{Y}$ or $\bar{b}\times(\bar{Z}\times\bar{b})$. An inverse transformation can then reproduce the vector product by its components in the directions 1, 2, 3.

When the input vector $\bar{Y}$ is expressed in the directions 1, 2, 3, the vector relationship (17) is constructed directly under its component relationships:

$$b_1=\int\left[\left(\frac{A}{b^2}-B\right)b_1-(Y_2+\omega_2)b_3+(Y_1+\omega_3)b_2\right]dt$$

$$b_2=\int\left[\left(\frac{A}{b^2}-B\right)b_2-(Y_3+\omega_3)b_1+(Y_1+\omega_1)b_3\right]dt$$

$$b_3=\int\left[\left(\frac{A}{b^2}-B\right)b_3-(Y_1+\omega_1)b_2+(Y_2+\omega_2)b_1\right]dt \qquad (19)$$

where:

$$b^2=b_1^2+b_2^2+b_3^2 \qquad (20)$$

If the vector $\bar{Y}$ is of the form $\bar{Y}=\bar{Z}\times\bar{b}$, relation (17) can be converted into relation (18), which calls for the following substitutions in (19):

$$\frac{A}{B}Z_1-(\bar{b}\cdot\bar{Z})b_1=-Y_2b_3+Y_3b_2$$

$$\frac{A}{B}Z_2-(\bar{b}\cdot\bar{Z})b_2=-Y_3b_1+Y_1b_3$$

$$\frac{A}{B}Z_3-(\bar{b}\cdot\bar{Z})b_3=-Y_1b_2+Y_2b_1 \qquad (21)$$

where:

$$\bar{b}\cdot\bar{Z}=b_1Z_1+b_2Z_2+b_3Z_3 \qquad (22)$$

When $\bar{Y}$ or $\bar{Z}$ is received in an auxiliary frame of reference, the option of transforming the output $\bar{b}$ into the auxiliary reference directions can be exercised for the purpose of performing the vector product computation. As a typical situation, one of the reference frames may be supported on one or more pivotal axes relative to the other. FIGURE 1*d* illustrates such a mount in three degrees of freedom. The auxiliary set of directions is labeled 1', 2', and 3'. $Y_1'$, $Y_2'$, $Y_3'$ or $Z_1'$, $Z_2'$, $Z_3'$ represent the components of $\bar{Y}$ or $\bar{Z}$ in these directions. The vector $\bar{b}$ transforms into its components $b_1'$, $b_2'$, $b_3'$ referring to 1', 2', 3' under a series of resolutions performed on $b_1$, $b_2$, and $b_3$ as:

$$\begin{aligned}P&=b_3\sin\phi-b_2\cos\phi\\ Q&=b_3\cos\phi+b_2\sin\phi\\ R&=b_1\cos\theta-Q\sin\theta\\ b_3'&=b_1\sin\theta+Q\cos\theta\\ b_2'&=R\sin\psi-P\cos\psi\\ b_1'&=R\cos\psi+P\sin\psi\end{aligned} \qquad (23)$$

(23) is a standard transformation scheme. Each of the resolutions in (23) is itself a coordinate transformation, the transformation passing between adjacent frames of reference having a common pivot axis. P, Q, and R represent intermediate component outputs; $\phi$, $\theta$, and $\psi$ represent the angles (FIGURE 1*d*) that sequentially displace the several reference frames defined by the mounting and pivotal geometry.

Subsequently, the vector product $\bar{b}\times\bar{Y}$ or $\bar{b}\times(\bar{Z}\times\bar{b})$ can be formed in the frame 1', 2', 3' as $$X_1'=-Y_2'b_3'+Y_3'b_2' \text{ or } \frac{A}{B}Z_1'-(\bar{b}\cdot\bar{Z})b_1'$$

$$X_2'=-Y_3'b_1'+Y_1'b_3' \text{ or } \frac{A}{B}Z_2'-(\bar{b}\cdot\bar{Z})b_2'$$

$$X_3'=-Y_1'b_2'+Y_2'b_1' \text{ or } \frac{A}{B}Z_3'-(\bar{b}\cdot\bar{Z})b_3' \qquad (24)$$

where:

$$\bar{b}\cdot\bar{Z}=b_1'Z_1'+b_2'Z_2'+b_3'Z_3' \qquad (25)$$

The vector product components $X_1'$, $X_2'$, $X_3'$ develop into an equivalent vector statement as $X_1$, $X_2$, $X_3$ in the directions 1, 2, 3 under a transformation inverse to (23) applied as:

$$\begin{aligned}S&=X_1'\sin\psi-X_2'\cos\psi\\ T&=X_1'\cos\psi+X_2'\sin\psi\\ U&=X_3'\cos\theta-T\sin\theta\\ X_1&=X_3'\sin\theta+T\cos\theta\\ X_2&=U\sin\phi-S\cos\phi\\ X_3&=U\cos\phi+S\sin\phi\end{aligned} \qquad (26)$$

With $X_1$, $X_2$, and $X_3$ so produced, the relations (19) are said by:

$$b_1=\int\left[\left(\frac{A}{b^2}-B\right)b_1-\omega_2b_3+\omega_3b_2+X_1\right]dt$$

$$b_2=\int\left[\left(\frac{A}{b^2}-B\right)b_2-\omega_3b_1+\omega_1b_3+X_2\right]dt$$

$$b_3=\int\left[\left(\frac{A}{b^2}-B\right)b_3-\omega_1 b_2+\omega_2 b_2+X_3\right]dt \qquad (27)$$

Relations (19) can be satisfied in other ways. The possibility of constraining the reference frame into zero components of angular velocity or of utilizing a reference frame possessing those properties to begin with has already been cited. The affected product terms accordingly drop out of relations (19). Another possibility is to produce the output vector $\bar{b}$ under the constraint that:

$$b_2=b_3=0 \qquad (28)$$

Then the relations (19) become:

$$b_1=b=\int\left(\frac{A}{b^2}-B\right)bdt \qquad (29)$$

$$0=Y_3+\omega_3 \qquad (30)$$

$$0=Y_2+\omega_2 \qquad (31)$$

and the output $\bar{b}$ belongs to the 1 axis alone. Under this reduction, relation (29) can be dispensed with. Its function is to fix the magnitude $b$. But, in being a single component, the magnitude $b$ can be assigned any constant value at once. Moreover, relations (30) and (31) are indifferent to this constant. The constant is necessary only in a process of transforming the vector $\bar{b}$ into another reference frame and in scaling $Y_2$ and $Y_3$ to express $d\bar{b}/dt$. In the absence of an expressed constant, $Y_3$ and $Y_2$ express $d\bar{b}/dt$ with the implication that $b$ is unity.

Relations (30) and (31) assert a requirement for specific control over the angular velocity components of the reference frame about the two axes perpendicular to the reference axis expressing $\bar{b}$. Hence, this reference frame 1, 2, 3 is serving as a specialized computing element, and the input vector $\bar{Y}$ invariably originates in a separate and distinct frame of reference. The components $Y_2$ and $Y_3$ have to be developed under a coordinate transformation. The coordinate transformation is subsequently affected by its own component outputs and is a functional participant in this process of establishing relations (19).

FIGURE 2 illustrates the situation. The vector $\bar{Y}$ passes to the gyro reference frame 1, 2, 3 from the supporting frame of reference 1', 2', 3'. The transformation proceeds as:

$$\begin{aligned} W&=Y_2'\cos\phi+Y_1'\cos\phi\\ Y_2&=Y_2'\cos\phi-Y_1'\sin\phi\\ Y_1&=Y_3'\sin\theta+W\cos\theta\\ Y_3&=Y_3'\cos\theta-W\sin\theta \end{aligned} \qquad (32)$$

Thereafter, the gyro reference frame is driven with the angular rates $-Y_2$ and $-Y_3$ about its 2 and 3 axes. This in turn affects the angles $\theta$ and $\phi$.

The input vector $\bar{Y}$ is asserted as $\bar{Z}\times\bar{b}$ in relations (30) and (31) when the substitutions (21) are applied with recognition of the conditions (28), so that:

$$\frac{A}{B}Z_2=-Y_3 b$$

$$\frac{A}{B}Z_3=Y_2 b \qquad (33)$$

But $A/B$ is just $b^2$ and $b$ is an arbitrary scale constant. In effect, the substitutions (21) enter relations (30) and (31) as:

$$\begin{aligned} 0&=-Z_2+\omega_3\\ 0&=Z_3+\omega_2 \end{aligned} \qquad (34)$$

The components $Z_2$ and $Z_3$ come into the gyro reference frame through a coordinate transformation of the input vector $\bar{Z}$ that is just like the transformation of $\bar{Y}$.

The figures present some varied embodiments of the directional computer. FIGURE 1 and any one of FIGURES 1*a*, 1*b*, and 1*c* illustrate examples from relations

(19) to (22). FIGURES 1 and 1*d* illustrate the example of relations (23) to (27). FIGURE 2 illustrates the example of relations (30), (31), and (32) and the like example of relations (32) and (34). FIGURE 6 illustrates a manner of forming the input vector (15) for incorporation in FIGURE 2.

The electro-mechanical integrators in FIGURE 1 produce their rotational outputs as signals $b_1$, $b_2$, and $b_3$. These integral outputs each position a number of linear potentiometers to yield products of multiplication. The first two potentiometers (from right to left, FIGURE 1) on each shaft are series connected through feedback amplifiers and are energized by a common transformer output $e$ to give the signals $-eb_1^2$, $-eb_2^2$, and $-eb_3^2$ as their end outputs. These three outputs all feed back, together with a reference voltage input E, into the amplifier that produces $e$. Through the high gain of the amplifier, the finite output $e$ is produced under the condition:

$$E-eb_1^2-eb_2^2-eb_3^2\approx 0$$

Therefore, $$e\approx\frac{E}{b_1^2+b_2^2+b_3^2}=\frac{E}{b^2}$$

and the first stage outputs from the series connected potentiometers are signals proportional to $b_1/b^2$, $b_2/b^2$, and $b_3/b^2$. These signals are delivered to the amplifier input stage of their respective integrators in accord with relations (19). The same applies to the signals $-b_1$, $-b_2$, and $-b_3$ that are tapped from the remaining three potentiometers of FIGURE 1. The signals scale to the desired coefficients A and B of relations (19) through the values to input summing resistors contained in the amplifiers. The further electrical signals that are delivered to the integrators are identified by the numerals 1 to 12 shown both in FIGURE 1 and in any one of the FIGURES 1*a*, 1*b*, 1*c*, and 1*d*.

In FIGURE 1*a*, six more potentiometers are positioned by the three shaft rotations $b_1$, $b_2$, and $b_3$. The potentiometers are energized by the signals $\pm(\omega_1+Y_1)$, $\pm(\omega_2+Y_2)$, and $\pm(\omega_3+Y_3)$ that are so combined in feedback amplifiers. The six products of multiplication return as inputs to the integrators of FIGURE 1 in accordance with relations (19). Only six of the twelve electrical return lines are utilized.

FIGURE 1*b* is functionally the equivalent of FIGURE 1*a*. Twelve rather than six potentiometer multiplications by $b_1$, $b_2$, and $b_3$ are generated under separate energizing by $\pm\omega_1$, $\pm\omega_2$, $\pm\omega_3$ and $\pm Y_1$, $\pm Y_2$, $\pm Y_3$. The products are all properly fed back and summed at the integrators of FIGURE 1. The separate development of the products in $b_{1,2,3}$ and $Y_{2,3,1}$ allows the components of $\bar{b}\times\bar{Y}$ to be formed to give $d\bar{b}/dt$.

FIGURE 1*c* repeats FIGURE 1*b* in its manner of producing the six products in $\omega_{1,2,3}$ and $b_{2,3,1}$ and applying them at the integrators of FIGURE 1. Thereafter, FIGURE 1*c* develops the substitutions asserted by relations (21) and (22). The signals $Z_1$, $Z_2$, $Z_3$ successively energize three potentiometers on the shaft outputs $b_1$, $b_2$, and $b_3$. The three products formed are submitted to a feedback amplifier for summation as the output $$-\bar{b}\cdot\bar{Z}=-(b_1Z_1+b_2Z_2+b_3Z_3)$$

This output is applied to three more potentiometers to generate the products $-(\bar{b}\cdot\bar{Z})b_1$, $-(\bar{b}\cdot\bar{Z})b_2$, and $-(\bar{b}\cdot\bar{Z})b_3$. These product signals and the signals $Z_1$, $Z_2$, and $Z_3$ enter the integrators of FIGURE 1 in accord with relations (21) and (19).

In FIGURE 1*d*, the vector product $\bar{b}\times\bar{Y}$ or $\bar{b}\times(\bar{Z}\times\bar{b})$ is developed in an auxiliary frame of reference directions 1', 2', 3' wherein the vector $\bar{Y}$ or $\bar{Z}$ is expressed by the signals $Y_1'$, $Y_2'$, $Y_3'$ or $Z_1'$, $Z_2'$, $Z_3'$. The signals $-b_1$, $-b_2$, and $-b_3$ come from FIGURE 1. Three resolvers, each capable of performing the computations:

$$\left.\begin{array}{l}\pm(x \sin a+y \cos a)\\ \pm(x \cos a-y \sin a)\end{array}\right\} a=\text{any angle}$$

on inputs $x$ and $y$ in any desired pairing of + and/or − signs, apply the transformation (23) and reproduce the output direction $\bar{b}$ as component signals $b_1'$, $b_2'$, $b_3'$ referred to the auxiliary reference frame. Three positioning servos can subsequently reproduce the signals $b_1'$, $b_2'$, and $b_3'$ as equivalent shaft rotations and the vector product computations (24) can proceed in the manner represented in FIGURES 1*b* and 1*c*. The signal summations noted as $X_1'$, $X_2'$, $X_3'$ in relations (24) form at the input terminals of three more resolvers performing the inverse transformation (26). The vector product is thus produced as signals $X_1$, $X_2$, $X_3$ referring to the gyro reference directions 1, 2, 3. $X_1$, $X_2$, and $X_3$ enter the integrators of FIGURE 1 in accordance with relations (27). The cross product signals $\omega_{1,2,3}$ and $b_{2,3,1}$ also enter the integrators of FIGURE 1 in accordance with relations (27), their formation being processed in the manner represented in FIGURES 1*b* and 1*c*.

In any of the foregoing embodiments, the product formations in $\omega_1$, $\omega_2$, $\omega_3$ and $b_1$, $b_2$, $b_3$ are eliminated in whole or in part by the special circumstance that the reference frame is stabilized so that one or more of its component angular velocities is zero. If, also, by the nature of the input vector in the particular reference frame utilized, one or two of the input vector components are consistently zero, all the computations regarding them in that reference frame go out.

FIGURE 2 shows an embodiment applying a controllable reference frame as furnished by a free gyro. The gyro spin axis, the inner gimbal axis, and their mutually perpendicular direction provide the reference directions 1, 2, and 3 respectively, the spin axis 1 being the output direction. The structure mounting the gyro defines the auxiliary reference directions 1', 2', 3'. Two resolvers receiving the input vector $\bar{Y}$ as components $Y_1'$, $Y_2'$, $Y_3'$ in the auxiliary frame of reference perform the transformation (32) to reproduce $\bar{Y}$ by its components $Y_1$, $Y_2$, $Y_3$ in the gyro reference frame. The component $Y_1$ is superfluous, however. The necessary components are $Y_2$ and $Y_3$. $Y_2$ and $Y_3$ must satisfy relations (30) and (31) by driving the gyro reference frame into component angular velocities that are in equal and opposite proportions to themselves. For this reason, $Y_2$ is first diminished through a resolver by the multiplying factor cos $\theta$. Then $Y_2 \cos \theta$ and $Y_3$ are amplified to precise power levels and energize linear torquemotors acting on the gyro about the 3' and 2 axes. $Y_3$, driving through the 2 axis, rotates the gyro about the 3 axis at a directly proportional rate. $Y_2 \cos \theta$, driving through 3', is offset by angle $\theta$ from the gyro's 3 axis. While causing the gyro to rotate about the 2 axis, $Y_2 \cos \theta$ induces a reaction torque normal to the pivotal axes of the outer gimbal. This reaction torque and the applied torque about 3' give their resultant about the 3 axis and act together to rotate the gyro. The resultant exceeds the applied torque by the factor sec $\theta$. But $Y_2$ has been reciprocally attenuated so that the gyro rotates about its 2 axis at a rate directly proportional to $Y_2$.

The relations (34) are produced instead of (30) and (31) in FIGURE 2 when $Y_2$ and $Y_3$ are identified as $Z_2$ and $Z_3$ and their roles in rotating the gyro reference frame are interchanged. In either case, the rotational rates must have the functionally correct sense and the torquemotor input connections must observe proper electrical polarities.

FIGURE 6 illustrates the facility with which the directional computer accommodates various, purposeful input vectors. In this example, the input vector of FIGURE 2 is developed as the quantity (15).

By FIGURE 6, the two left-most resolvers in FIGURE 2 are consigned to a transformation between a vertical gyro and the free gyro. This transformation refers a signal $g$ to a physically demonstrated vertical direction and resolves it in stages into the free gyro frame of reference. Thereafter, the component outputs $g_3$, $g_2$, and $g_1$ are submitted to additional computations that modify them into components conforming to the vector quantity (15). These components are developed for the 2 and 3 axes and drive the free gyro in just the manner illustrated with $Y_2$ and $Y_3$ in FIGURE 2.

The upper resolver in FIGURE 6 is rotated under the feedback of one of its outputs and acquires the angle $\eta$ that produces its other output as the resultant of the inputs $g_2$ and $g_3$. The same angle $\eta$ positions the lower resolver. The indicated input and output relationships for the lower resolver are self-evident under the relationships $$\eta=\frac{g_3}{\sqrt{g_2^2+g_3^2}}$$

and $$\cos \eta=\frac{g_2}{\sqrt{g_2^2+g_3^2}}$$

that have been established. The outputs obtained apply as the components of the vector quantity (15) in the 3 and 2 axes (FIGURE 2) since $\bar{g}\cdot\bar{b}=g_1$ in this embodiment and the gain factor $K_1$ is allowed to vary as $$K_1=\frac{K}{\sqrt{g_2^2+g_3^2}}$$

The inventor claims:

1. A directional computer comprising a physically defined reference frame, means of obtaining a plurality of input signals in representation of any desired values, said input signals being referred to said reference frame to express an input vector, means of generating a plurality of signals describing the angular motion of said reference frame in space, said signals of angular motion indicating the angular velocity vector of said reference frame, and means to receive the said input and angular motion signals and generate a plurality of output signals expressing an outer vector in relation to said reference frame as the integral of the cross product vectors between the said output vector and the said angular velocity vector and between the said output vector and the said input vector, whereby the said output vector rotates around the said input vector.

2. A directional computer comprising a physically defined, stabilized reference frame having means of sensing and suppressing its angular velocity, means of obtaining a plurality of input signals in representation of any desired values, said input signals being referred to said reference frame to express an input vector, and means to receive the said input signals and generate a plurality of output signals expressing an output vector in relation to said reference frame as the integral of the cross product vector between the said output vector and the said input vector, whereby the said output vector rotates around the said input vector.

3. A directional computer comprising a physically defined, stabilized reference frame having means of sensing and suppressing its angular velocity, the axes of said reference frame being denoted by the numerals 1, 2, 3, means of obtaining an input signal in representation of any desired value, said input signal being referred to said axis 3 to express an input vector, and means to receive the said input signal and generate a pair of output signals expressing an output vector in reference to the said axes 1 and 2 as the integral of the cross product vector between the said output vector and the said input vector, whereby the said output vector is driven by the said input signal to rotate around the said axis 3.

4. A directional computer comprising a physically defined first reference frame and a second reference frame defined with respect to the said first frame by means to perform a coordinate transformation therebetween, means of obtaining a plurality of input signals in representation of any desired values, said input signals being referred to said second reference frame to express an input vector, means of generating a plurality of signals describing the angular motion of said first reference frame in space, said signals of angular motion indicating the angular velocity vector of said first reference frame, and means, including said coordinate transformation means, to receive the said input and angular motion signals and generate a plurality of output signals expressing an output vector in relation to said first reference frame as the integral of the cross product vectors between the said output vector and the said angular velocity vector and between the said output vector and the said input vector, whereby the said output vector rotates around the said input vector.

5. A directional computer comprising a physically defined first reference frame and a second reference frame defined with respect to the said first frame by means to perform a coordinate transformation therebetween, means of obtaining an input signal in representation of any desired value, said input signal being referred to an axis of said second reference frame to express an input vector, means of generating a plurality of signals describing the angular motion of said first reference frame in space, said signals of angular motion indicating the angular velocity vector of said first reference frame, and means, including said coordinate transformation means, to receive the said input and angular motion signals and generate a plurality of output signals expressing an output vector in relation to said first reference frame as the integral of the cross product vectors between the said output vector and the said angular velocity vector and between the said output vector and the said input vector, whereby the said output vector rotates around the said input vector.

6. A directional computer comprising a physically defined, stabilized reference frame having means of sensing and suppressing its angular velocity, a second reference frame defined with respect to the said stabilized frame by means to perform a coordinate transformation therebetween, means of obtaining a plurality of input signals in representation of any desired values, said input signals being referred to said second reference frame to express an input vector, and means, including said coordinate transformation means, to receive the said input signals and generate a plurality of output signals expressing an output vector in relation to said stabilized reference frame as the integral of the cross product vector between the said output vector and the said input vector, whereby the said output vector rotates around the said input vector.

7. A directional computer comprising a physically defined, stabilized reference frame having means of sensing and suppressing its angular velocity, a second reference frame defined with respect to the said stabilized frame by means to perform a coordinate transformation therebetween, means of obtaining an input signal in representation of any desired value, said input signal being referred to an axis of said second reference frame to express an input vector, and means, including said coordinate transformation means, to receive the said input signal and generate a plurality of output signals expressing an output vector in relation to said stabilized reference frame as the integral of the cross product vector between the said output vector and the said input vector, whereby the said output vector rotates around the said input vector.

8. A directional computer comprising a physically defined reference frame, mens of obtaining a plurality of input signals in representation of any desired values, said input signals being referred to said reference frame to express an input vector, means of generating a plurality of signals describing the angular motion of said reference frame in space, said signals of angular motion indicating the angular velocity vector of said reference frame, and means to receive the said input and angular motion signals and generate a plurality of output signals expressing an output vector in relation to said reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

9. A directional computer comprising a physically defined, stabilized reference frame, means of obtaining a plurality of input signals in representation of any desired values, said input signals being referred to said reference frame to express an input vector, and means to receive the said input signals and generate a plurality of output signals expressing an output vector in relation to said reference frame as the integral of a vector quantity consisting of the said input vector and the negative value of the said output vector multiplied by the scalar product between the said input and output vectors, whereby the said output vector rotates around a direction perpendicular both to the said output vector and the said input vector.

10. A directional computer comprising a physically defined, stabilized reference frame, means of obtaining an input signal in representation of any desired value, said input signal being referred to an axis of said reference frame to express an input vector, and means to receive the said input signal and generate a plurality of output signals expressing an output vector in relation to said reference frame as the integral of a vector quantity consisting of the said input vector and the negative value of the said output vector multiplied by the scalar product between the said input and output vectors, whereby the said output vector rotates around a direction perpendicular both to the said output vector and the said input vector.

11. A directional computer comprising a physically defined first reference frame and a second reference frame defined with respect to the said first frame by means to perform a coordinate transformation therebetween, means of obtaining a plurality of input signals in representation of any desired values, said input signals being referred to said second reference frame to express an input vector, means of generating a plurality of signals describing the angular motion of said first reference frame in space, said signals of angular motion indicating the angular velocity vector of said first reference frame, and means, including said coordinate transformation means, to receive the said input and angular motion signals and generate a plurality of output signals expressing an output vector in relation to said first reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

12. A directional computer comprising a physically defined first reference frame and a second reference frame defined with respect to the said first frame by means to perform a coordinate transformation therebetween, means of obtaining an input signal in representation of any desired value, said input signal being referred to an axis of said second reference frame to express an input vector, means of generating a plurality of signals describing the angular motion of said first reference frame in space, said signals of angular motion indicating the angular velocity vector of said first reference frame, and means, including said coordinate transformation means, to receive the said input and angular motion signals and generate a plurality of output signals expressing an output vector in relation to said first reference frame as the integral of a vector quantity consisting of the said input vector, the negative value of the said output vector multiplied by the scaler product between the said input and output vectors, and the cross product vector between the said output vector and the said angular velocity vector, whereby the said output vector rotates around a direction perpendicular both to the said output vector and the said input vector.

13. A directional computer comprising a physically defined, stabilized reference frame and a second reference frame defined with respect to the said stabilized frame by means to perform a coordinate transformation therebetween, means of obtaining a plurality of input signals in representation of any desired values, said input signals being referred to said second reference frame to express an input vector, and means, including said coordinate transformation means, to receive the said input signals and generate a plurality of output signals expressing an output vector in relation to said stabilized reference frame as the integral of a vector quantity consisting of the said input vector and the negative value of the said output vector multiplied by the scalar product between the said input and output vectors, whereby the said output vector rotates around a direction perpendicular both to the said output vector and the said input vector.

14. A directional computer comprising a physically defined, stabilized reference frame and a second reference frame defined with respect to the said stabilized frame by means to perform a coordinate transformation therebetween, means of obtaining an input signal in representation of any desired value, said input signal being referred to an axis of said second reference frame to express an input vector, and means, including said coordinate transformation means, to receive the said input signal and generate a plurality of output signals expressing an output vector in relation to said stabilized reference frame as the integral of a vector quantity consisting of the said input vector and the negative value of the said output vector multiplied by the scalar product between the said input and output vectors, whereby the said output vector rotates around a direction perpendicular both to the said output vector and the said input vector.

15. A directional computer comprising a physically defined, stabilized reference frame and a separate reference axis defined with respect to the said stabilized frame by means to perform coordinate resolutions therebetween, means of obtaining an input signal in representation of any desired value, said input signal being referred to said separate axis to express an input vector, and means, including said coordinate resolution means, to receive the said input signal and generate a plurality of output signals expressing an output vector in relation to said stabilized reference frame as the integral of a vector quantity consisting of the said input vector and the negative value of the said output vector multiplied by the scalar product between the said input and output vectors, whereby the said output vector rotates around a direction perpendicular both to the said output vector and the said input vector.

16. A directional computer comprising a physically defined reference frame and a separate reference axis defined with respect to the said reference frame by means to perform coordinate resolutions therebetween, means of obtaining an input signal in representation of any desired value, said input signal being referred to said separate axis to express an input vector, means of generating a plurality of signals describing the angular motion of said reference frame in space, said signals of angular motion indicating the angular velocity vector of said reference frame, and means, including said coordinate resolution means, to receive the said input and angular motion signals and generate a plurality of output signals expressing an output vector in relation to said reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

17. A directional computer comprising means of generating a plurality of signals describing the angular motion of a physical reference frame in space, said reference frame being defined by the said means, said signals of angular motion indicating the angular velocity vector of said reference frame, means of obtaining a plurality of input signals in representation of any desired values, said input signals being referred to said reference frame to express an input vector, and means to receive the said input and angular motion signals and generate a plurality of output signals expressing an output vector in relation to said reference frame as the integral of the cross product vectors between the said output vector and the said angular velocity vector and between the said output vector and the said input vector, whereby the said output vector rotates around the said input vector.

18. A directional computer comprising means of generating a plurality of signals describing the angular motion of a physical reference frame in space, said reference frame being defined by the said means, said signals of angular motion indicating the angular velocity vector of said reference frame, a second reference frame defined with respect to the said physical frame by means to perform a coordinate transformation therebetween, means of obtaining a plurality of input signals in representation of any desired values, said input signals being referred to said second reference frame to express an input vector, and means, including said coordinate transformation means, to receive the said input and angular motion signals and generate a plurality of output signals expressing an output vector in relation to said physical reference frame as the integral of the cross product vectors between the said output vector and the said angular velocity vector and between the said output vector and the said input vector, whereby the said output vector rotates around the said input vector.

19. A directional computer comprising, means of generating a plurality of signals describing the angular motion of a physical reference frame in space, said reference frame being defined by the said means, said signals of angular motion indicating the angular velocity vector of said reference frame, a second reference frame defined with respect to the said physical frame by means to perform a coordinate transformation therebetween, means of obtaining an input signal in representation of any desired value, said input signal being referred to an axis of said second reference frame to express an input vector, and means, including said coordinate transformation means, to receive the said input and angular motion signals and generate a plurality of output signals expressing an output vector in relation to said physical reference frame as the integral of the cross product vectors between the said output vector and the said angular velocity vector and between the said output vector and the said input vector, whereby the said output vector rotates around the said input vector.

20. A directional computer comprising means of generating a plurality of signals describing the angular motion of a physical reference frame in space, said reference frame being defined by the said means, said signals of angular motion indicating the angular velocity vector of said reference frame, means of obtaining a plurality of input signals in representation of any desired values, said input signals being referred to said reference frame to express an input vector, and means to receive the said input and angular motion signals and generate a plurality of output signals expressing an output vector in relation to said reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

21. A directional computer comprising means of generating a plurality of signals describing the angular motion of a physical reference frame in space, said reference frame being defined by the said means, said signals of angular motion indicating the angular velocity vector of said reference frame, a second reference frame defined with respect to the said physical frame by means to perform a coordinate transformation therebetween, means of obtaining a plurality of input signals in representation of any desired values, said input signals being referred to said second reference frame to express an input vector, and means, including said coordinate transformation means, to receive the said input and angular motion signals and generate a plurality of output signals expressing an output vector in relation to said physical reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

22. A directional computer comprising means of generating a plurality of signals describing the angular motion of a physical reference frame in space, said reference frame being defined by the said means, said signals of angular motion indicating the angular velocity vector of said reference frame, a second reference frame defined with respect to the said physical reference frame by means to perform a coordinate transformation therebetween, means of obtaining an input signal in representation of any desired value, said input signal being referred to an axis of said second reference frame to express an input vector, and means, including said coordinate transformation means, to receive the said input and angular motion signals and generate a plurality of output signals expressing an output vector in relation to said physical reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

23. A directional computer comprising means of generating a plurality of signals describing the angular motion of a physical reference frame in space, said reference frame being defined by the said means, said signals of angular motion indicating the angular velocity vector of said reference frame, a separate reference axis defined with respect to the said reference frame by means to perform coordinate resolutions therebetween, means of obtaining an input signal in representation of any desired value, said input signal being referred to said separate axis to express an input vector, and means, including said coordinate resolution means, to receive the said input and angular motion signals and generate a plurality of output signals expressing an output vector in relation to said reference frame as the integral of a vector quantity consisting of the said input vector, the negative value of the said output vector multiplied by the scalar product between the said input and output vectors, and the cross product vector between the said output vector and the said angular velocity vector, whereby the said output vector rotates around a direction perpendicular both to the said output vector and the said input vector.

24. A directional computer comprising a physically defined reference frame adapted to rotate about two of its axes, means of receiving angular rate signals and generating corresponding rotations of said reference frame relative to space about said rotational axes, means responsive to said rotations to produce coordinate resolutions between the said rotational axes and the axes of a second reference frame, whereby said second reference frame is defined with respect to the said rotational axes, and means of obtaining a plurality of input signals in representation of any desired values, said input signals being referred to said second reference frame to express an input vector, the said coordinate resolutions being applied to the said input signals to produce transformed signals expressing the two components of the said input vector relating to the said rotational axes, the said transformed signals forming the said angular rate signals, whereby the direction perpendicular to the said rotational axes in said physically defined reference frame is caused to rotate in a known way with respect to the said input vector.

25. A directional computer comprising a physically defined reference frame adapted to rotate about two of its axes, means of receiving angular rate signals and generating corresponding rotations of said reference frame relative to space about said rotational axes, means responsive to said rotations to produce coordinate resolutions between the said rotational axes and a separate reference axis, whereby said separate axis is defined with respect to the said rotational axes, and means of obtaining an input signal in representation of any desired value, said input signal being referred to said separate axis to express an input vector, the said coordinate resolutions being applied to the said input signal to produce transformed signals expressing the two components of the said input vector relating to the said rotational axes, the said transformed signals forming the said angular rate signals, whereby the direction perpendicular to the said rotational axes in said physically defined reference frame is caused to rotate in a known way with respect to the said input vector.

References Cited by the Examiner

UNITED STATES PATENTS

| | | | |
|---|---|---|---|
| 2,923,465 | 2/1960 | Arshal | 235—189 X |
| 3,049,294 | 8/1962 | Newell | 235—150.25 |
| 3,087,333 | 4/1963 | Newell | 235—150.25 X |
| 3,164,340 | 1/1965 | Slater et al. | 235—150.25 X |
| 3,214,575 | 10/1965 | Seliger et al. | 235—150.25 |

MALCOLM A. MORRISON, *Primary Examiner.*

I. KESCHNER, *Assistant Examiner.*

UNITED STATES PATENT OFFICE
CERTIFICATE OF CORRECTION

Patent No. 3,319,052 May 9, 1967

George Arshal

It is certified that error appears in the above identified patent and that said Letters Patent are hereby corrected as shown below:

Column 2, line 67, "$\bar{b}\times\bar{Z}\times\bar{b}$" should read -- $\bar{b}\times(\bar{Z}\times\bar{b})$ --. Column 3, line 1, "variable" should read -- valuable --. Column 5, line 61, "$Y_1$" should read -- $Y_3$ --. Column 7, line 1, "$\omega_2 b_2$" should read -- $\omega_2 b_1$ --. Column 9, line 22, after "signals" insert -- in --. Column 10, line 22, "$\eta$" should read -- sin $\eta$ -- line 47, "outer" should read -- output --. Column 12, line 1, "mens" should read -- means --. Column 13, line 10, "scaler" should read -- scalar --.

Signed and sealed this 24th day of March 1970.

(SEAL)
Attest:

Edward M. Fletcher, Jr.
Attesting Officer

WILLIAM E. SCHUYLER, JR.
Commissioner of Patents